United States Patent [19]
Chen

[11] Patent Number: 5,934,218
[45] Date of Patent: Aug. 10, 1999

[54] PLANING VESSEL

[76] Inventor: Zhencheng Chen, Room 308# Bldg. 822, Zhongguancun, Beijing 100080, China

[21] Appl. No.: 08/793,377
[22] PCT Filed: Jun. 30, 1995
[86] PCT No.: PCT/CN95/00054
  § 371 Date: Feb. 12, 1997
  § 102(e) Date: Feb. 12, 1997
[87] PCT Pub. No.: WO96/05096
  PCT Pub. Date: Feb. 22, 1996

[30] Foreign Application Priority Data

Aug. 13, 1994 [CN] China ................................. 94114846
Mar. 2, 1995 [CN] China ................................. 95203983

[51] Int. Cl.$^6$ ............................................................ B63B 1/32
[52] U.S. Cl. .......................................... 114/288; 114/290
[58] Field of Search ...................... 114/56, 271, 288–290; D12/300, 310–314

[56] References Cited

U.S. PATENT DOCUMENTS

| | | | |
|---|---|---|---|
| 2,938,490 | 5/1960 | Martin | 114/290 |
| 3,602,179 | 8/1971 | Cole . | |
| 4,708,085 | 11/1987 | Blee | 114/290 |
| 4,862,817 | 9/1989 | Hornsby, Jr. et al. | 114/288 |
| 5,191,849 | 3/1993 | Labrucherie et al. | 114/290 |
| 5,231,949 | 8/1993 | Hadley . | |
| 5,357,894 | 10/1994 | Jacobson . | |
| 5,425,325 | 6/1995 | Washio | 114/290 |

FOREIGN PATENT DOCUMENTS

| | | |
|---|---|---|
| 89102251 | 11/1989 | China . |
| 1106441 | 3/1968 | United Kingdom . |
| WO 95/16603 | 6/1995 | WIPO . |

*Primary Examiner*—Ed L. Swinehart
*Attorney, Agent, or Firm*—Dickinson Wright PLLC

[57] ABSTRACT

A planing vessel has a hull and a propulsion and control system. The hull has a plane bottom formed of an equicrural triangle in the front and a rectangle at the back, two boards and one or more swell guideways. Each swell guideway has an inclined top line with a lower front and a higher back denting upwardly into and extending lengthwise throughout the bottom and paralleling its centerline. The hull also has a pair of wave-splash guards inlaid or dented one into the boards as an integrated body, a deck, a cabin and an upper construction. The planing vessel so formed can generate sufficient hydrodynamic buoyancy with reasonable distribution to quickly lift itself out of the water and enter a planing state. The planing vessel can have various fine performances, desirable speed and stability to move on rough waters.

21 Claims, 10 Drawing Sheets

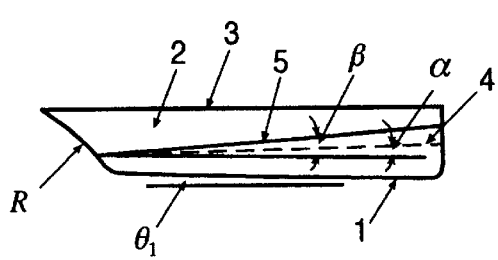
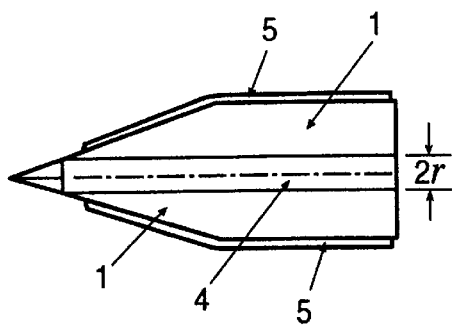
FIG. 1  FIG. 2
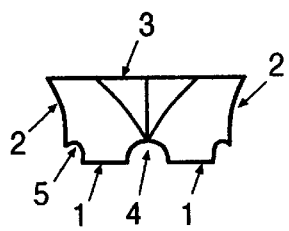 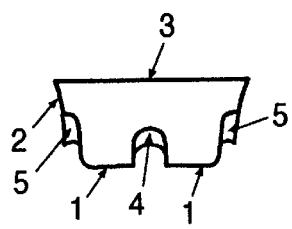 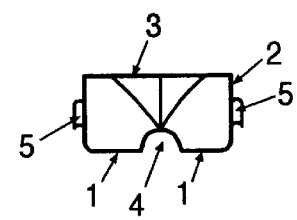
FIG. 3  FIG. 4  FIG. 4-1
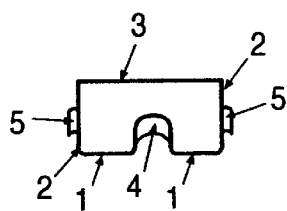 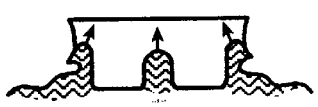 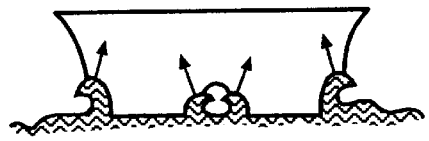
FIG. 4-2  FIG. 4-3  FIG. 4-4
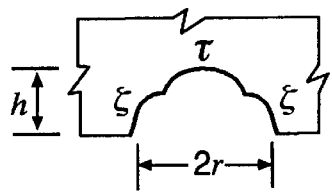 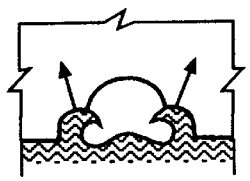
FIG. 4-5  FIG. 4-6

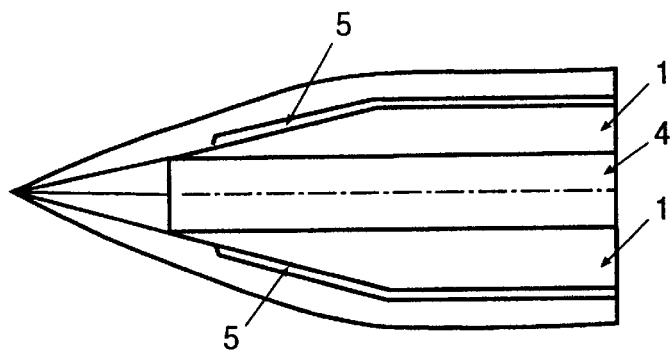
FIG. 8-1
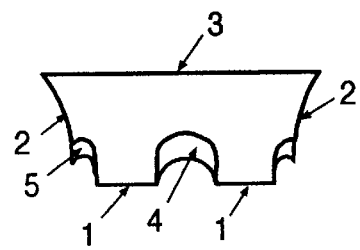 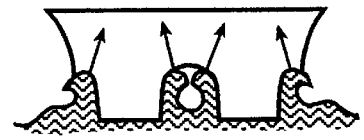
FIG. 8-2   FIG. 8-3   FIG. 8-4
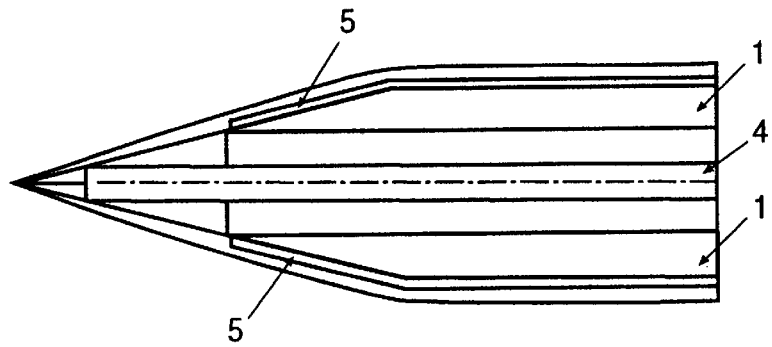
FIG. 9-1
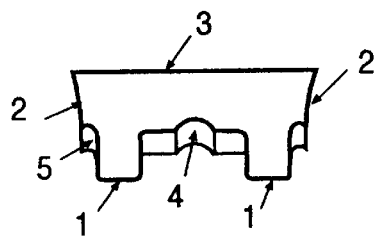 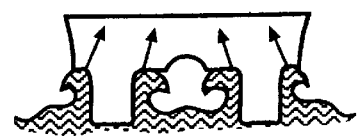
FIG. 9-2   FIG. 9-3   FIG. 9-4

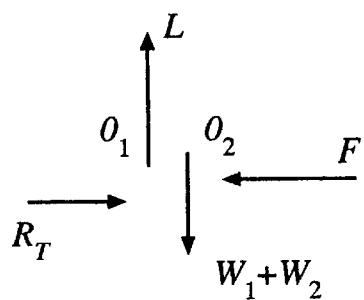
(A)
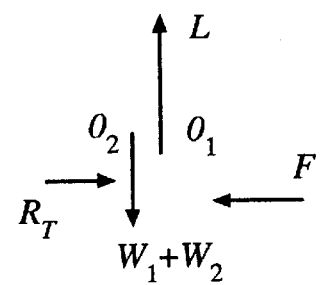
(B)
FIG. 10
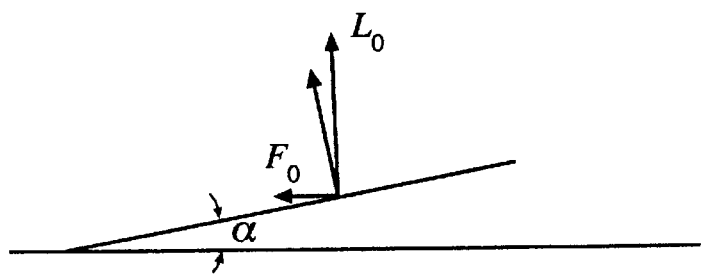
FIG. 11
FIG. 12-1
FIG. 12-2

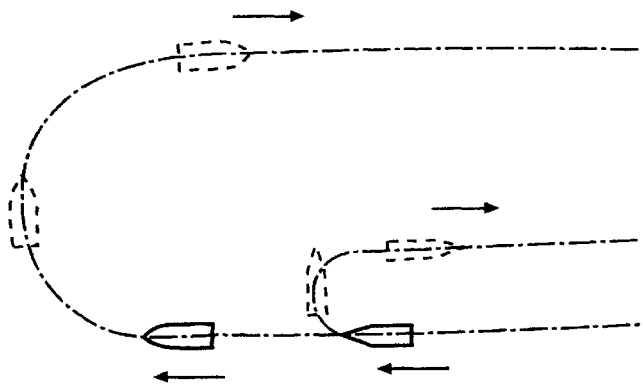
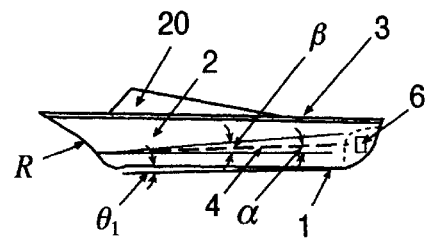
FIG. 24
FIG. 25-1
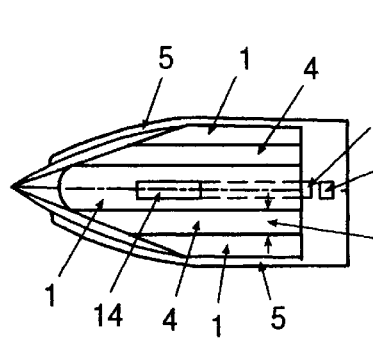
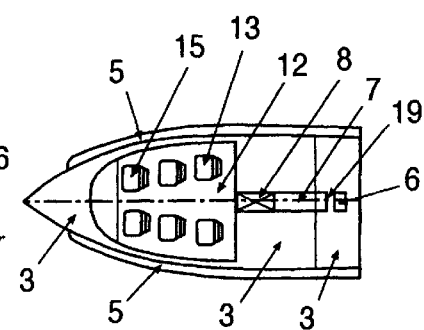
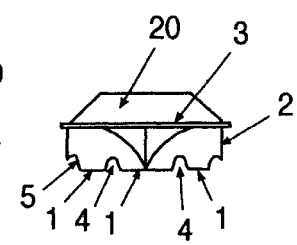
FIG. 25-2
FIG. 25-3
FIG. 25-4
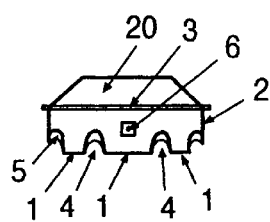
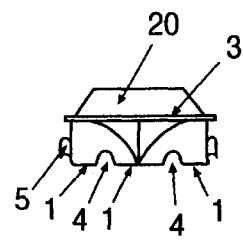
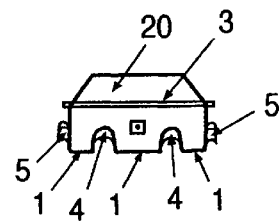
FIG. 25-5
FIG. 25-6
FIG. 25-7

PLANING VESSEL

FIELD OF THE INVENTION

The present invention relates to boats and ships, and more particularly, to a planning vessel.

BACKGROUND OF THE INVENTION

Typical displacement ships have good stability to meet the needs for various cargo tonnage. However, when a displacement ship carries more cargo, its hull draft becomes high. An increased draft can cause more water resistance during the ship movement which, in turn, leads to more power consumption and thus makes it difficult to increase its speed and improve its performance.

Hydrofoil crafts can reduce a large portion of water resistance and, therefore, enhance their travel speed. However, Hydrofoil crafts have low load capability and poor seaworthiness.

Surface effect crafts, such as hovercrafts, can reduce water resistance and thus increase their travel speed. However, surface effect crafts are unable to use the hydrodynamic buoyancy to support their weight. Moreover, a large amount of power has been consumed in order for them to generate dynamic air cushion. Further, their advantages can all disappear when there is a raid of lateral wind.

Typical planing boats have low draft in planing state and therefore can have an increased travel speed. They usually adopt a deep or a shallow V-shaped hull to improve the moving stability and lateral stability. However, a planing boat has dihedrals on its hull. Hence, the wet area at the hull bottom and splash at both boards increase to cause more water resistance. Moreover, a planing boat usually rides at an angle relative to the water surface with its bow up high and its stern low, which can further increase water resistance and induce bounce and pitching when traveling at a high speed or on rough waters. Certain improved planing boats, as disclosed in U.S. Pat. Nos. 5,265,554, 5,016,552, 5,231,949, 4,722,294, etc., adopt a shallow V-shaped hull or partly deep-V bottom to acquire certain merits. However, the performance of such improved planing boat are still similar to those V-shaped bottom planing boats. The improvements are very limited.

Sea-knife boats can be one kind of planing boats. They have faster speed and better performance in storms than other planing boats. However, sea-knife boats have triangular plane hull bottoms, which results in reduced stability and poor operative function.

SUMMARY OF THE INVENTION

In order to overcome the problems existing in conventional boats and ships to improve the performance of boats and ships, the present invention provides a novel planing vessel which comprises a hull and a propulsion and control system. The hull consists of a bottom, two boards, a deck, one or more swell guideways, a pair of wave-splash guards, cabin and upper constructions. The bottom is composed of an equicrural triangle portion in the front and a rectangle portion at the back. One or more swell guideways are provided at the bottom denting upwardly into the space between the bottom and deck and extending through the entire length of the bottom. The swell guideways are symmetrical and parallel to a centerline at the bottom. When there is only one swell guideway, its bottom centerline coincides with the centerline of the bottom. Each swell guideway opens downwardly, forwardly and backwardly.

The cross section of each swell guideway is a  or  or -shaped. The longitudinal section of the swell guideway is -shaped, whose top line is inclined with a lower front and a higher back. Wave-splash guards are provided on the boards below the deck and above the bottom. Wave-splash guards are inclined baffles with a lower front and a higher rear. They can be inlaid onto boards or dented thereinto to form integrated boards.

The planing vessel hull so formed can generate the hydrodynamic flow field and corresponding sufficient hydrodynamic buoyancy with reasonable distribution as designed during its movement. Thus, the vessel hull can reduce water resistance to increase its travel speed. In the mean time, the vessel hull can use the hydrodynamic buoyancy generated during its movement to increase the load capability so as to meet the needs of various cargo tonnage. Therefore, various performances during operation can be greatly improved so that the planing vessel can move in rough waters at a supercritical operation state.

The front of the hull below the deck can be designed by removing a portion of the fore foot and forming an inclined camber which extends downwardly and backwardly from the deck front end to the bottom front end. The side walls located above the waterline determined when the hull is in static state flare and curve upwardly and outwardly on both sides of hull centerline. The front of the hull can also be other shapes.

The stern can have steps. When the vessel is moving in displacement state at low speeds, the step can be overspreaded by a step cover to form a smooth streamline stern end so as to reduce water resistance. When the hull is lifted out of the water and runs in planing state, the cover can be retracted to expose the steps and the planing vessel can move at an increased speed. The stern can also be designed as a stepless streamline or else.

The planing vessel having the hull according to the present invention can be further provided with a propulsion and control system of the present invention. At the rear of the hull, one or more water-jet propulsion plants can be installed near the water surface between the inner sides of the boards and between the deck and the waterline when the vessel is in planing state. The water jets are positioned at the stern end. Rudders installed are slightly apart from the stern end and correspond to the water jets. Water jets and rudders are located above, but near the water surface when the vessel is in planing state. Various features of the hull according to the present invention can display improved performance in navigating. In addition, the hull according to the present invention can also adopt propeller or other propulsion and control systems. The present invention applies to various types of small-sized, middle-sized as well as large-sized boats and ships.

BRIEF DESCRIPTION OF THE DRAWINGS

Each figure of FIG. 1 to FIG. 16-2 only shows part of hull structure below the deck of the planing vessel according to the present invention.

The arrows pointing vertically upward shown in each figure illustrate additional lifts provided by the swell guideways. The arrows symmetrically inclining inward at boards illustrate the additional forces provided by the wave-splash guards. The arrows symmetrically inclining inward or outward in the space inside both boards illustrate the additional forces provided by the swell guideways.

FIG. 3 is a front elevation view of the hull shown in FIG. 1;

FIG. 4 is a rear elevation view of the hull shown in FIG. 1, in which wave-splash guards are dented into boards to form an integral body;

FIGS. 4-1 and 4-2 are front and rear elevation views of the hull, in which wave-splash guards are inlaid into boards;

FIG. 4-3 is a rear elevation view of the hull showing hydrodynamic flow field generated when the planing vessel is in motion;

FIG. 4-4 is a rear elevation view of the hull having a swell guideway of a ⌒-shaped cross section showing the flow field generated;

FIGS. 4-5 and 4-6 are cross section views of swell guideways with a ⌒-shaped cross section, wherein h is the top height of the section, 2r is the width of the base plane of the swell guideway, ζ is the arc length of the side, τ is the arc length of the top;

FIG. 4-7 is a bottom plan view of a swell guideway while r<r";

FIG. 5 is a plane layout scheme of bottom;

FIGS. 6-1, 6-2, 6-3 and 6-4 are side elevation, bottom plan, front elevation and rear elevation views of the hull with two swell guideways, in which wave-splash guards are dented into boards forming an integral body;

FIGS. 6-5 and 6-6 are front and rear elevation views of the hull, in which wave-splash guards are inlaid into boards;

FIGS. 6-7 and 6-8 are rear elevation views of the hull with two swell guideways having ∩-shaped and ⌒-shaped cross sections respectively showing the hydrodynamic flow field generated by the moving hull;

FIG. 7-1 is a bottom plan view of the hull with three swell guideways;

FIG. 7-2 is a rear elevation view of the hull with three swell guideways having the same height showing hydrodynamic flow field generated by the moving hull;

FIGS. 7-3 and 7-4 are rear elevation views of the hull having three swell guideways with different heights and inclination showing flow field generated by the moving hull;

FIGS. 8-1, 8-2 and 8-3 are respectively bottom plan view, front and rear elevation views of the hull with wider swell guideway;

FIG. 8-4 is a rear elevation view of the hull with wider swell guideway showing flow field generated by the moving vessel;

FIGS. 9-1, 9-2 and 9-3 are respectively bottom plan view, front and rear elevation views of the hull with swell guideway having bigger width;

FIG. 9-4 is a rear elevation view of the hull with bigger width swell guideway showing the flow field generated by the moving hull;

FIG. 10 is a dynamic balance scheme when the vessel is in motion;

FIG. 11 is a side view of the additional hydrodynamic force provided by the swell guideway in the flow field generated by the moving hull, wherein a is the inclination angle of top line of the swell guideway to the bottom of the hull, $L_0$ is the additional lift, $F_0$ is the additional thrust;

FIG. 12-1 is a diagram showing the attitude and relation of a conventional planing boat when traveling in rough waters, in which the arrow indicates the travel direction of the boat;

FIG. 12-2 is a diagram showing the attitude and relation of a planing vessel of the present invention when traveling in rough waters;

FIGS. 13-1, 13-2 and 13-3 are side elevation, bottom plan and rear elevation views of the hull with one swell guideway and a mobile rigid or semirigid step cover at the stern;

FIGS. 14-1, 14-2 and 14-3 are side elevation, bottom plan and rear elevation views of the hull with one swell guideway and a flexible step cover at the stern;

FIGS. 15-1 and 15-2 are bottom plan view, rear elevation view of the hull having two swell guideways and a mobile rigid or semirigid step cover at the stern, the side elevation view of the hull being the same as FIG. 13-1;

FIGS. 16-1 and 16-2 are bottom plan view, rear elevation view of the hull with two swell guideways and a flexible step cover, the side elevation view of the hull being the same as FIG. 14-1;

FIG. 24 is a diagram showing the comparison between the turning radius of a planing vessel with a sharp head according to the present invention and that of a conventional ship with blunt head;

FIGS. 25-1, 25-2 and 25-3 are side elevation view, bottom plan view and top plan view of the deck plane of a boat of the present invention, which has two swell guideways and a water-jet propulsion plant;

FIGS. 25-4 and 25-5 are front and rear elevation views of the boat shown in FIG. 25-1, in which wave-splash guards are dented into the boards;

FIGS. 25-6 and 25-7 are front and rear elevation views of the boat shown in FIG. 25-1, in which the wave-splash guards are inlaid into boards;

FIGS. 26-1, 26-2 and 26-3 are side elevation view, bottom plan view and top plan view of the deck plane of a boat adopting one or two outboard motors as propeller;

FIGS. 26-4 and 26-5 are front and rear elevation views of the boat of FIG. 26-1, in which the wave-splash guards are dented into the boards; and FIGS. 26-6 and 26-7 are front and rear elevation views of the boat of FIG. 26-1, in which the wave-splash guards are inlaid into the boards.

FIGS. 27-1 and 27-2 are a front elevation view and rear elevation view of the planning vessel shown in FIG. 27.

DETAILED DESCRIPTION OF THE PREFERRED EMBODIMENTS

Figures 4, 5, 6, 7:
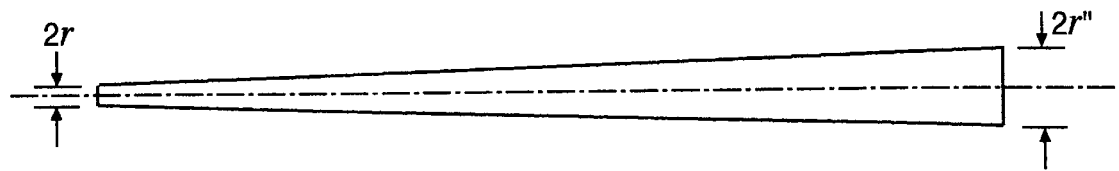
Figure 5:
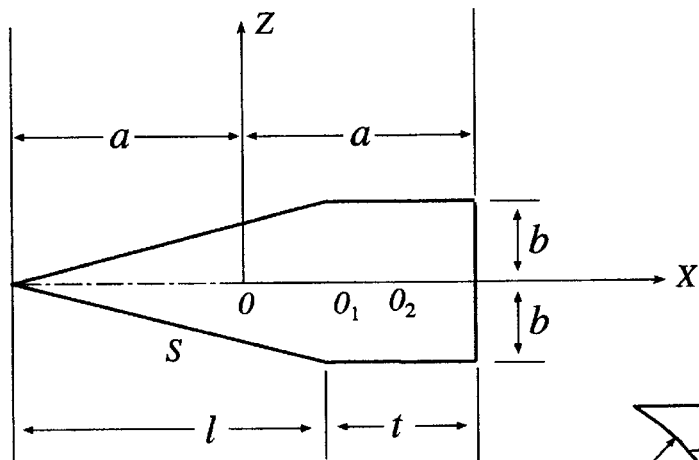

As shown in FIGS. 1, 2, 3 and 4, the part below the deck plane of the hull of the present invention mainly comprises a bottom 1, boards 2, a deck 3, swell guideways 4 and a pair of wave-splash guards 5.

Bottom 1 consists of an equicrural triangle portion in the front and a rectangle portion at the back. Referring to FIG. 5, the specific size of the bottom 1 is determined as follows:

The coordinate origin O is located at the centerline of bottom 1 and is the midpoint of overall length 2a of bottom 1; OX is the ordinate; OZ is the abscissa; $O_1$ is coordinate of center of the hydrodynamic buoyancy; $O_2$ is the coordinate of center of gravity of the vessel; l is the projection length of both equilateral sides S of the triangle portion of bottom 1 on OX axis; the length of the rectangle portion in the direction OX is t and the width of the rectangle portion in the direction of OZ axis is 2b; the specific sizes of l, 2b, t are determined according to the design needs and referring to expressions (1) and (2):

Expression (1) is $L=2\rho U^2 a^2 P \sin \theta$, wherein L is the hydrodynamic buoyancy, wherein, $$P = \int_{-a}^{a-t} T_1(x)dx + \int_{a-t}^{a} T_2(x)dx, \; T_1(x) = \int_{-b(x)}^{b(x)} p(x,z)dz,$$

$$p(x,z) = \frac{Ka}{1-K\delta} \left\{ \frac{G\exp(-\overline{G}x)\cosh k_0 z}{k_0 \xi \cosh \overline{G} \cosh k_0 b} + \right.$$

$$2\sum_{n=1}^{5} \frac{(-1)^{n-1}}{C_n^2} [-\sin C_n x + k_0 R_n \cos B_n z (B_n \cos C_n x - k_0 \sin C_n x) +$$

$$\left. k_0 G b J_n \cos D_n z (D_n \cos E_n x - k_0 \sin E_n x)] \right\},$$

$R_n = 1/(k_0^2 + B_n^2)\cos B_n b, \; J_n = 1/(k_0^2 + D_n^2)\cos E_n, \; B_n = GC_n,$ $\xi = \sqrt{1+\varepsilon^2}, \; C_n = (2n-1)\pi/2, \; D_n = C_n/b', \; E_n = C_n/Gb',$ $b(x) = bx/2, \; x = X/a, \; z = Z/a, \; G = \sqrt{(1-K\delta)/K\delta}, \; K = g/U^2,$ $$T_2(x) = \int_{-b}^{b} p(x,z)dz, \; \varepsilon = 0.0045, \; \overline{G} = k_0/G, \; b' = b/a.$$

Expression (2) is X=M/L, wherein X is the distance between the point O and the center $O_1$ of the hydrodynamic buoyancy, wherein, $$M = 2\rho U^2 a^3 N \sin\theta, \quad N = \int_{-a}^{a-t} xT_1(x)dx + \int_{a-t}^{a} xT_2(x)dx,$$

wherein ρ is the density of water; U is the ship speed; θ is the attack angle of the bottom plane against the horizontal when the vessel is in motion state; $W_1$ is the weight of the vessel; $W_2$ is the load weight; M is the force moment of the lifting pressure p(x,z) on the bottom plane with respect to the midpoint O of the bottom centerline; $\theta_1$ is the attack angle of the bottom plane against the horizontal when the vessel is in static state, general, being about 5°, or determined by the permissible static draft at the stern end, the vessel length and other factors, or being ignored if the gravity center of the vessel is located above the direction line of the total thrust; $0.1 \leq k_o \leq 1$ (or determined by design needs); g is the acceleration of gravity; δ is half depth of the stern end draft (determined by design needs); $L=W_1+W_2$ when the vessel is in planing state.

Figures 1, 6:
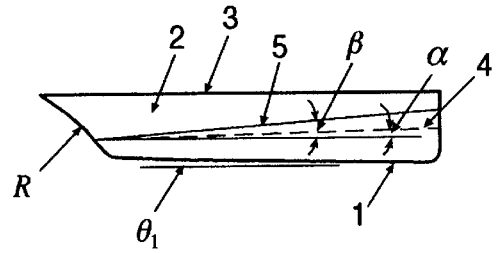
Figures 2, 6:
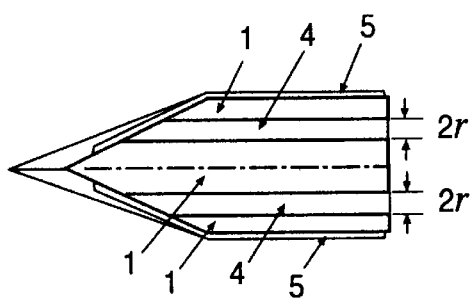

According to the present invention, bottom 1 is designed to be a plane base, instead of a deep V-shaped base, and has an equicrural triangle portion and a rectangle portion. The corresponding hull has a sharp stem and a wide stern. The stem has its bottom corner removed to form an arc shape with a curvature radius of R (see FIG. 1). Therefore, the lift surface of the stem is very small when the vessel is in planing state. When the stem enters waves, there is no big slamming disturbance. A small moment of stern trim is generated when the vessel continues to move through waves. However, such moment of stern trim will be eliminated by the moment of stem trim generated by a larger lift surface at the stern. Therefore, thus the longitudinal trim is very small. Moreover, since the lower stem is removed (FIG. 1), lower portions of the boards are nearly vertical (FIGS. 3, 4, 4-1, and 4-2). Therefore, the sensitivity of the vessel in response to waves is greatly reduced, which provides an important condition for making the vessel move smoothly on rough waters (FIG. 12-2).

The front portion of bottom 1 being designed as an equicrural triangle is beneficial for moving through rough waters. The rear portion of bottom 1 being designed to be a rectangle is advantageous for increasing usable space of the hull and for moving the center $O_1$ of hydrodynamic buoyancy L forward appropriately. $O_1$ can be positioned in a best range when considering the locations of the total thrust F and the total resistance $R_T$ and regulating the sizes of s, t, b in design. The position of $O_2$ can therefore be adjusted when the vessel is moving to locate $O_1$ slightly ahead of $O_2$ when the moment of the total thrust F and the total resistance $R_T$ is counterclockwise (FIG. 10A) or behind $O_2$ if the moment is clockwise (FIG. 10B). A better planing attack angle can therefore be formed.

In order to reduce water resistance, increase the additional thrust and improve various performances when the vessel is in operation, one or more swell guideways 4 are provided, which dent upwardly into and extend lengthwise throughout the bottom 1 in a space between deck 3 and bottom 1. Each swell guideway 4 is a groove having a cross section with a top portion having an arch-shape, an inverted V-shape, or a multi-arch shape with a high center arch and two lower half arches placed symmetrically on both sides and having a longitudinal section of a ⌐┐-shape. The groove top at the front end of the groove denting vertically into the bottom 1 is at same level of the waterline when the vessel is in static state. The front end of the groove top can also be lower than the waterline based on design needs for vessels with a deeper draft in static state. The bottom centerline of the groove is parallel and symmetrical to the centerline of the hull bottom. If there is only one swell guideway 4, its bottom centerline coincides with the centerline of the hull bottom (FIGS. 1, 2, 4, 6-2, 6-4, 7-1 and 7-2). The top line of the swell guideway 4 has a lower front and a higher back to form an inclination angle α relative to the hull bottom 1 (FIGS. 1, 2 and 11).

The inclination angle a and the width 2r of the bottom plane of the swell guideway 4 are determined based on the design needs and referring to expressions (3) and (4):

Expression (3) is $F_o = 4\rho U^2 a^2 Q \sin\theta \sin\alpha$, wherein $F_o$ is the additional thrust provided by the swell guideway, wherein, $$Q = \frac{H_1 \tanh \overline{G}}{k_0^2 \xi \cosh k_0 b} - k_0 \sum_{n=1}^{3} \left[ (-1)^{n-1} J_n H_2 \sin E_n + R_n \frac{H_3}{G} \right],$$

$$H_1 = 4r' + Ak_0^2, \quad H_2 = \frac{A}{b'} - \frac{4b'r'}{C_n^2}, \quad H_3 = AG^2 - \frac{4r'}{C_n^2},$$

-continued $$A = 2r'b'^2 + 4b'r'^2 + 8r'^3/3, \quad r' = r/a.$$

Expression (4) is $L_o=4\rho U^2 a^2 Q \sin\theta \cos\alpha$, wherein $L_o$ is the additional lift provided by the swell guideway.

In the process that the vessel is lifted out of the water and enters planing state, the water near the stem pushed by the moving hull will partially enter the swell guideway 4 and flow smoothly towards the stern. In this way, the swell height of water surface near the stem is lowered to therefore greatly reduce the water resistance accordingly. As seen from the bottom plane of bottom 1 (FIG. 2), there are two planing plates with a 2r interval between them. Apart from the water being pushed to gush to the outside of both plates, part of the pushed water must gush into the 2r interval. Hence, the swell height of the water surface near both boards which is caused by the water pushed to both boards 2 by bottom 1 can also be reduced, since part of the pushed water gushes into the swell guideway 4. Thus, energy loss can be reduced and, as a result, water resistance is reduced. The water gushing into the swell guideway 4 not only reduces the water resistance, but also generates additional lift and moment of lateral stability (FIGS. 4-3 and 6-7), to thereby improve course stability, lateral stability and performance of the vessel.

The top of swell guideway 4 having a lower front and a higher back forms a top with an inclination angle $\alpha$ relative to bottom 1. The inclined top makes the additional force provide part of the forward thrust (FIG. 11) to increase the vessel speed. As seen from the cross section views of the hull shown in FIGS. 2, 3 and 4, the periphery of concave arc for the groove is bigger than 2r. In other words, the swell guideway 4 provided increases the wetted area on bottom 1, which in turn increases the frictional resistance on the bottom 1. However, as a matter fact, by selecting appropriate inclination angle $\alpha$ of the groove top, the additional thrust provided by swell guideway 4 can be made much bigger than the increased frictional resistance. In addition to the great reduction of water resistance by lowering the swell height of water surface near the stem and both boards 2, the swell guideway 4 demonstrates advantages of both reducing water resistance and increasing forward thrust and lift.

When the cross section of swell guideway 4 is designed as a ⌒-shape (FIGS. 9-4, 4-4, 4-5 and 4-6) and the condition $\zeta<r$ is satisfied (FIG. 4-5), water gushes upward and moves along the arc surface $\zeta$ (FIG. 4-6) when the vessel enters planing state, to avoid the arc surface $\tau$ to get wet. In this case, the swell guideway 4 provided can, in fact, reduce the wet area, and therefore further reduces the frictional resistance and increases the vessel speed. When the hull bottom 1 has large ratio a:b, the bottom plane of the swell guideway 4 can be designed as the shape shown in FIG. 4-7. However, the taper must be limited in a small range for the purpose of greatly lowering the swell height of water surface near both boards 2 without causing vortex and turbulent flow in the groove. Such tapered swell guideway 4 can be adopted only when it has a better reduction of water resistance and increase of thrust than that of a rectangle shaped one through calculation and experiments.

With respect to middle-sized and large-sized vessels, plural swell guideways 4 (FIGS. 6-2, 6-4, 7-1 and 7-2), or wide swell guideway 4 (FIGS. 8-1, 8-2 and 8-3), or very wider swell guideway 4 (FIGS. 9-1, 9-2 and 9-3) can be used based on design needs. For middle-sized and small-sized vessels, one, two or three swell guideways 4 can be used (FIGS. 18, 20, 21, 25-1 to 25-7, 26-1 to 26-7 and 7-1 to 7-4).

Figures 3, 6:
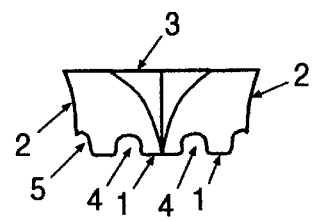
Figures 4, 6:
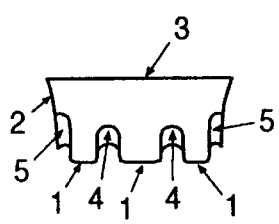
Figures 5, 6:
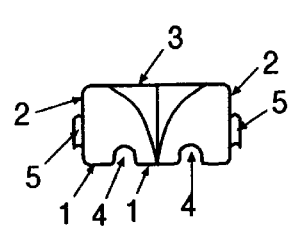
Figure 6:
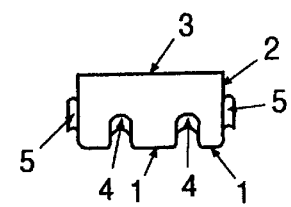
Figures 6, 7:
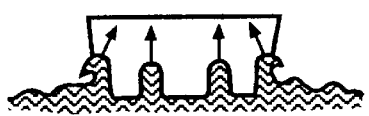
Figures 6, 7, 8:
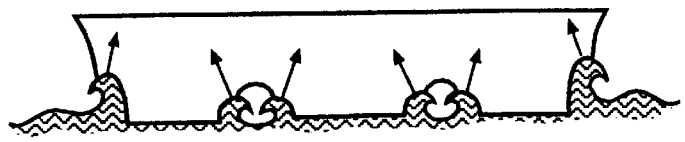
Figures 1, 7:
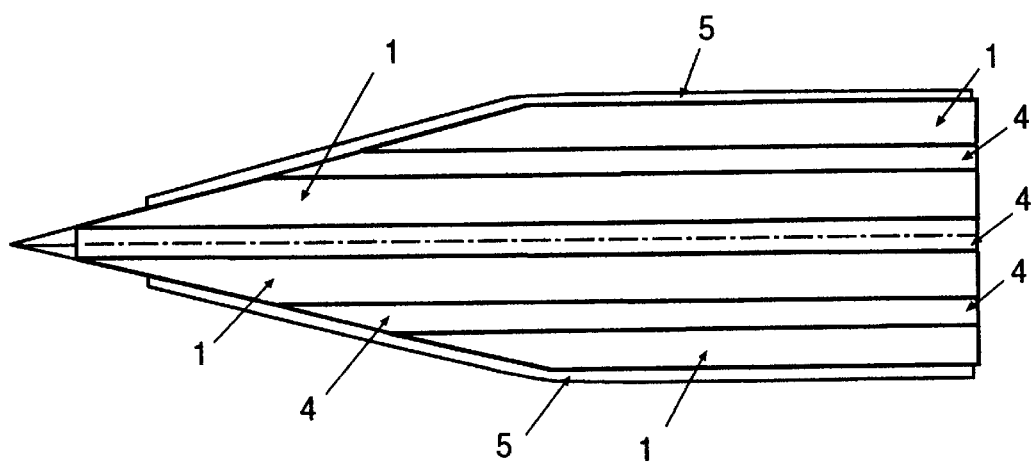
Figures 2, 7:
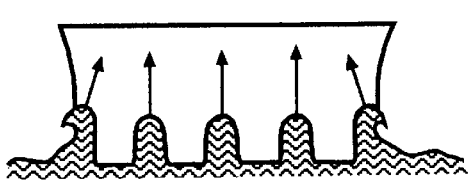
Figures 3, 7:
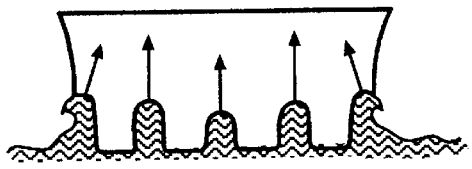
Figures 4, 7:
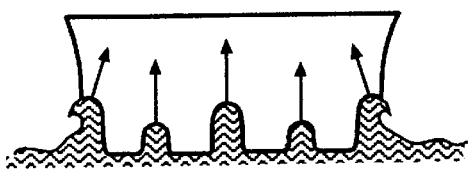
Figures 1, 13:
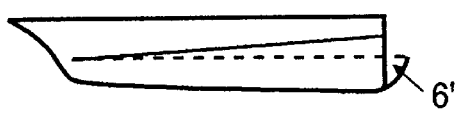
Figures 2, 13:
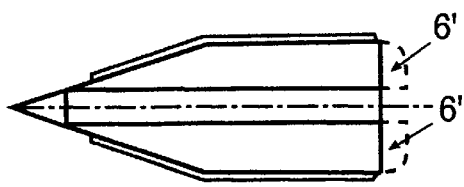
Figures 3, 13:
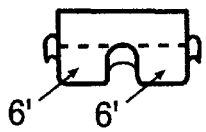
Figures 1, 14:
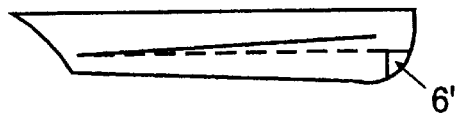
Figures 2, 14:
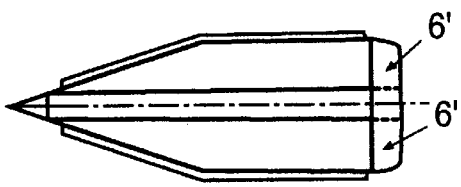
Figures 3, 14:
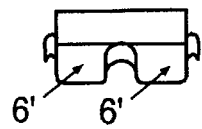
Figures 1, 15:
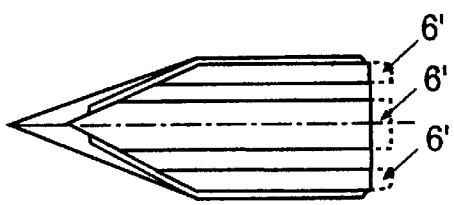
Figures 2, 15:
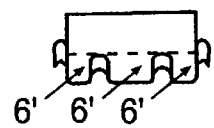
Figures 1, 16:
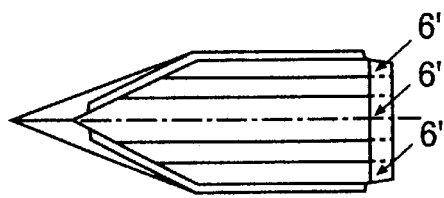
Figures 2, 16:
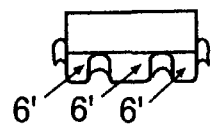
Figure 17:
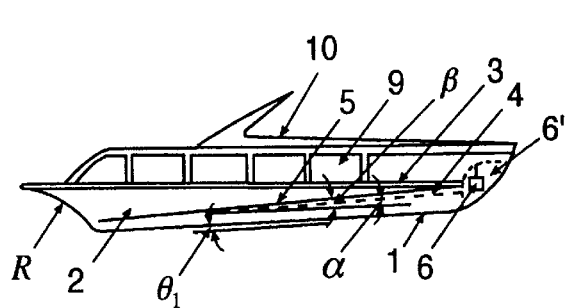
FIG. 17 is a side elevation view of a planing vessel of the present invention having one swell guideway and a pair of water-jet propulsion plants.
Figure 18:
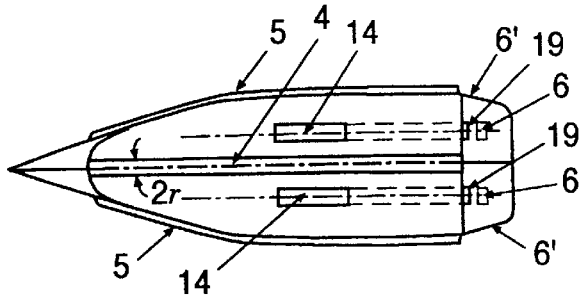
FIG. 18 is a bottom plan view of the planing vessel showing in FIG. 17.
Figure 19:
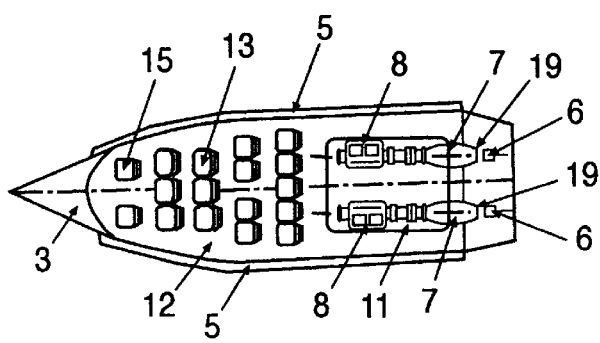
FIG. 19 is a top plan view of the deck plane of the planing vessel shown in FIG. 17.
Figure 20:
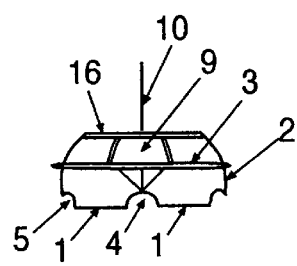
FIGS. 20 and 21 are a front and rear elevation views of the vessel shown in FIG. 17 respectively.
Figure 21:
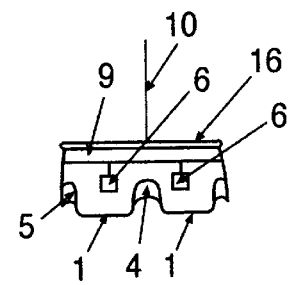

When two or more swell guideways 4 are provided, their top line inclination angles (or heights, widths) can be the same (FIGS. 6-4, 6-6 and 7-2) or different (FIGS. 7-3 and 7-4). If the inclination angles (or heights, widths) are different, then swell guideways 4 with the same top line inclination angle must be paired and positioned symmetrically on both sides of the hull centerline.

The height and top line inclination angle of a swell guideway 4 can be increased appropriately. An increase of the height and inclination of a pair of swell guideways 4, which are symmetrical and parallel to the centerline of the hull bottom, provides the hull of the present invention with the feature of multi-hulled ship but with advantages over a conventional multi-hulled ship. When the number of swell guideways 4 is odd, an increase of the height and top line inclination angle of the swell guideway 4 having a bottom plane centerline coinciding with the centerline of the hull bottom provides the hull with the feature of a catamaran but with advantages over a conventional catamaran. The reason is 35 that a swell guideway 4 with a larger height and top line inclination angle can not only define two sides the vessel hull but also securely link both sides of the hull. Such a swell guideway 4 provides additional lift and thrust beneficial for the increase of the vessel speed and stabilities which a conventional catamaran or multi-hulled ship is unable to provide when it is in motion. Therefore, it is feasible to use the hull structure of the present invention to achieve the performance of a catamaran or multi-hulled ship. If two or more folding lines with different inclination angles are used to form the top line of a swell guideway 4, adjacent folding lines are joined by a streamlined arc.

In summary, the swell guideway 4 provided can greatly reduce water resistance and further generate additional lift and thrust to, therefore, increase the vessel speed, course stability and lateral stability, to improve the vessel performance, flexibility and seaworthiness, and to lower the vessel sensitivity in response to rough waters.

The swell guideway 4 of the present invention can be separately and independently applied to a partly V-shaped or otherwise shaped hull bottom. In this case, the angle a is taken as the inclination of the top line of the swell guideway 4 with respect to the projection plane of the hull bottom, and angle $\theta$ is taken as the attack angle of the projection plane of the hull bottom against the horizontal plane when the vessel is in motion state while angle $\theta_1$ is taken as the attack angle when the vessel in static state. Such ships, after adopting the swell guideway, have partly improved performance, but they are not as perfect as the plane bottom ones.

As shown in FIGS. 1, 3 and 4, wave-splash guards 5 are provided on both boards 2. The wave-splash guard 5 has a lower front and a higher rear forming an inclination angle $\beta$ relative to the hull bottom 1. Angle $\beta$ is a matching angle of angle $\alpha$ and can be determined according to design needs and referring to angle $\alpha$. The lowest point of the wave-splash guard 5, which is located at the front end of the wave-splash guard 5, is at the same level of the waterline when the hull is in static state. For hulls with deeper draft in static state, such lowest point of the wave-splash guard 5 can be slightly lower than the waterline depending on design.

Wave-splash guard 5 can be a baffle having a lower front end and a high rear end and a cross section of an arc shape, a ⋀ shape or a ⌐ shape. The baffle can be inlaid into the surfaces of the boards 2 (FIGS. 4-1, 4-2, 6-5 and 6-6), or dented into the boards 2 to form an integrated body with each board 2 (FIGS. 3, 4, 6-3 and 6-4). Thus, waves and splashes rising on both boards 2 will roll down along the surface of the wave-splash guard 5 (FIGS. 4-3 and 6-7), which not only reduces the wet area on both boards 2 to decrease water frictional resistance, but also generates additional lift and thrust. In addition, wave-splash guards 5 can reduce or even eliminate spray or splash interference in the vision of passengers when the vessel is moving.

According to the planing vessel of the present invention, the stern can have a step (FIGS. 1 and 6-1). When the vessel is operating in displacement state at low speed, the step must be overspreaded by a step cover 6' to form a smooth streamlined stern end. Thus, water can flow out of the stern smoothly to thereby reduce water resistance at the stern. When the hull is lifted out of the water and enters planing state, step cover 6' can be retracted to reveal the step. The race near the hull stern then is separated from the hull after the step. Hence, the wet area of the hull is reduced, which greatly reduces water resistance and further increases the vessel speed.

The step cover 6' can be rigid, semirigid or flexible. A rigid cover is made of thin metal plate. The rigid cover extends out and opens to cover the step through a transmission mechanism when the vessel moves at a low speed and retracts to reveal the step when the vessel enters planing state. A semirigid cover 6' is made of rigid metal plate and flexible rubber cloth. The rigid plate extends out or retracted through a transmission mechanism, and the flexible rubber cloth does through compressed air (FIGS. 13-1, 13-2, 13-3, 15-1 and 15-2). A flexible step cover 6' is made of flexible rubber cloth. The flexible step cover is filled with air and opened to overspread the step when the vessel is moving in displacement state and is retracted to reveal the step when the vessel enters planing state (FIGS. 14-1, 14-2, 14-3, 16-1 and 16-2). For small boats with low draft in static state, the step cover 6' is not necessary. The stern can be streamlined without steps or otherwise.

At the front of the hull, a portion of fore foot is removed below the deck 3 and an inclined camber is formed extending downwardly and backwards from the deck front end to the bottom front end. The lift surface of the hull bottom 1 is thus moved backwards. As a result, the capability of the hull of moving smoothly on rough waters is greatly enhanced. Moreover, the side walls of the hull located above the waterline determined when the hull is in static state but below the deck 3 flare and curve upwardly on both sides of the hull centerline. Such design not only widens useful area of deck 3, but also avoids the vessel from diving into facing waves. The front of the hull may also be other shapes.

The bottom 1 of the planing vessel according to the present invention employs a streamlined arc for joining the equicrural triangle portion and the rectangle portion (FIGS. 18, 25-2 and 26-2). Corresponding cabins and upper construction can be designed based on different applications. If there is specific application for the deck plane, then a corresponding plane area layout can be made in accordance with the practical needs.

Figure 22:
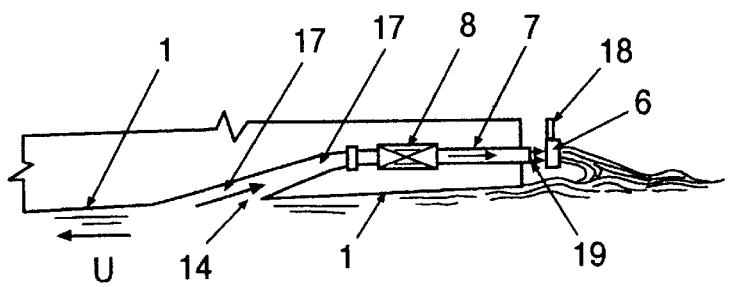
FIG. 22 is a longitudinal section view of the power water-jet propulsion system.

In addition to the hull of the present invention as illustrated above, a propulsion and control system is provided. One or more water-jet propulsion plants 7 are positioned at the rear of the hull near the water surface, in the space between the deck 3 and waterline determined when the vessel is in planing state and between the inner sides of both boards 2 (FIGS. 18, 19, 25-2 and 25-3). Water jets 19 are positioned at the stern end. Water inlets 14 are appropriately located at the hull bottom 1. Water inlets 14 must keep sufficient distance from the swell guideway 4, bow, the stern end and both boards 2 to ensure that air can not enter water inlet 14 and minimize the loss of water head along the way and for local area in the water entry way 17 (FIG. 22). The acceleration of water can be achieved by way of water pump or others.

Rudders 6 are provided nearby the stern end corresponding to water jets. The rudder surface acted by the water-jet flow makes the vessel turn, or brake. Rudders 6 can be fixed at the stern and their rotating shafts 18 are linked up with a steering engine to control the rudders 6 to turn. Rudder 6 can also be designed so that it can rise or descend along the rotating shaft 18. To make turns, rudders 6 can be descended and dovetailed with the water-jet flow to then turn or brake. Afterwards, rudders 6 can be elevated out of the water-jet flow.

When water jets 19 and corresponding rudder 6 are positioned above, but near the water surface when the vessel is in planing state, one of the advantages is that the water resistance at stern is minimized. A further advantage is that the performance, flexibility and seaworthiness of the vessel are greatly improved. Therefore, when the vessel turns on the planing surface under the action of turning moment of rudder 6, it has the least water resistance and a small turning radius (FIG. 24). Further, swell guideways 4 can increase the lateral stability of the hull when turning to minimize the draft of the hull. Therefore, vessels, and particularly small boats, can smoothly navigate in rivers or oceans of deep water, shallow water, rough water with strong and rapid currents and submerged reefs.

In summary, the hull of the planing vessel according to the present invention adopts a plane bottom 1 consisting of an equicrural triangle portion in the front and a rectangle portion at the back. Such plane bottom 1 maximizes the lift coefficient and minimizes the wet area and corresponding frictional resistance. The plane bottom 1 also results in a small lift surface at stem and a large lift surface at stern. Accordingly, the trim is small. In addition, the swell guideway 4 provided reduces the swell height of water surface near both the front of the vessel and the boards 2 and generates additional lift and thrust. All these features generate a hydrodynamic buoyancy with sufficient strength and reasonable distribution to ensure that the hull can quickly rise out of the water to start planing and then reach its predetermined speed. The vessel has good course stability and lateral stability and fine performance, flexibility and seaworthiness. Furthermore, the vessel is irresponsive to waves and can move smoothly through waves to provide a safety and comfort ride in rough or choppy water. The vessel also has sufficient carrying capabilities. Consequently, the planing vessel of the present invention can smoothly move in rough waters to achieve the supercritical operation state (FIG. 12-2).

Generally speaking, the planing vessel of the present invention has a much higher speed than those of displacement ships when using the same power and carrying equal load. Other performances of the planing vessel is also better than those of displacement ships. The load carrying capability, as well as other performances, of the planing vessel of the present invention can be much better than those of hydrofoil crafts, surface effect crafts or other existing general planing boats. Accordingly, the hull of the planing vessel according to the present invention has advantages over hulls of conventional ships. This is because the hull of the present invention has low power consumption and large controllable range for speed and load carrying capability variation and is smooth, safe and flexible in moving.

INDUSTRIAL APPLICATION

Embodiment 1: A tour boat designed according to the present invention (FIGS. 17–22). The hull has a plane bottom 1 with an equicrural triangle portion and a rectangle portion. A swell guideway 4 is provided denting vertically into and extending lengthwise throughout bottom 1 and has a bottom width of 2r. The swell guideway 4 has a cross section of a ∩-shape and a longitudinal section of ⌐-shape. Wave-splash guards 5 are provided denting into each board 2. A semirigid step cover 6' is provided at the stern. A pair of water-jet propulsion plants 7 and their corresponding rudders 6 and power plants 8 are provided at the back of the hull parallel and symmetrical to the hull centerline. The water jets 19 are positioned at the stern end. The water jets 19 and rudders 6 are above, but near the water surface when the vessel is in planing state. Two water inlets 14 are positioned one on each side of the bottom centerline. The upper construction 9 is designed in a streamline shape. In the passenger cabin 12 there is a driver seat 15 and a plurality of passenger seats 13. An engine room 11 is positioned in an appropriate location at the rear of the hull. Two power plants 8 are provided in the engine room 11. The Water-jet propulsion plants 7 are linked to the power plant 8. A ceiling 16 is provided on the upper construction 9. A ship mast 10 is put in the longitudinal and mid location on the ceiling 16. The boat has the performance of the present invention as discussed above.

Embodiment 2: A small boat designed according to the present invention (FIGS. 25-1, 25-2, 25-3, 25-4, 25-5, 25-6 and 25-7). The small boat has a plane bottom 1 having an equicrural triangle portion and a rectangle portion. Two swell guideways 4 are symmetrically provided one on each side of the centerline of the bottom. A pair of wave-splash guards 5 is provided on each board. A driver seat 15 and five passenger seats 13 are provided in a passenger cabin 12. A water-jet propulsion plant 7 and its corresponding rudder 6 and power plant 8 are provided in the middle of and parallel to the hull centerline. Water inlet 14 is positioned on the centerline of the bottom 1. Water jet 19 and rudder 6 are above, but near the water surface when the vessel is in planing state. Windshield 20 is provided at the stem. A convertible top can be provided, which opens to cover the cabin when it is needed and retracts when it is not needed. This boat has a very low draft when it is in planing state. It can move smoothly and safely in inland rivers or lakes with shoal.

Embodiment 3: Providing seven passenger seats 13 in a passenger cabin 12 and adopting the hull layout of Embodiment 2 of the present invention. The outboard motor provided at the stern is taken as propeller. When a twin-propeller is used, two seats 21 for outboard motors are provided at the stern end. When a mono-propeller is used, one seat 22 of outboard motor is provided, see FIGS. 26-1 to 26-7.

Figure 23:
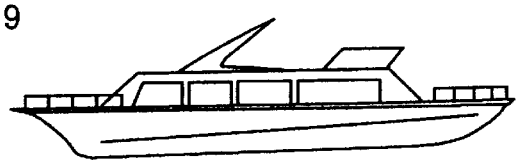
FIG. 23 is a side elevation view of a traffic boat pertaining to the series of planing vessels designed according to features of the present invention and needs of a cabin and upper construction of a traffic boat.
Figures 1, 26:
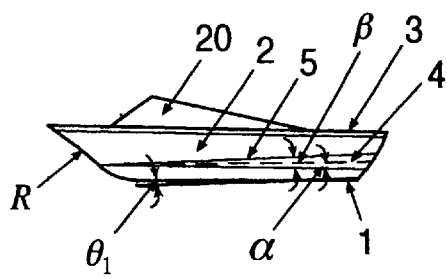
Figures 2, 26:
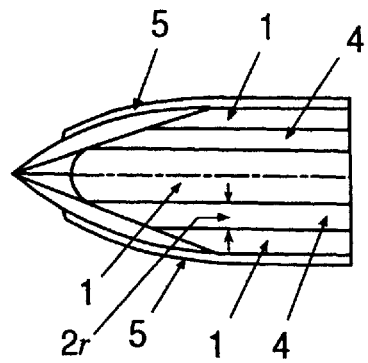
Figures 3, 26:
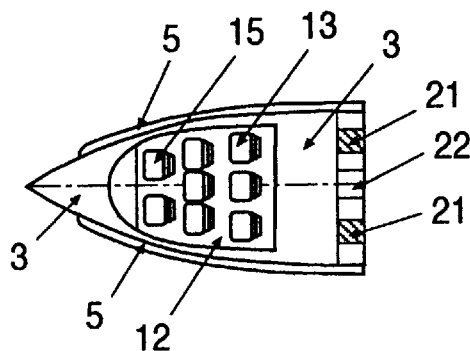
Figures 4, 26:
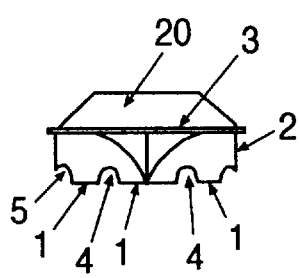
Figures 5, 26:
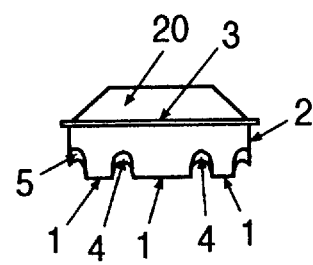
Figures 6, 26:
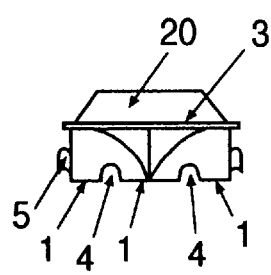
Figures 7, 26:
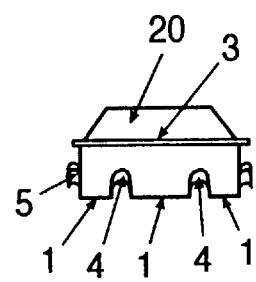
Figure 27:
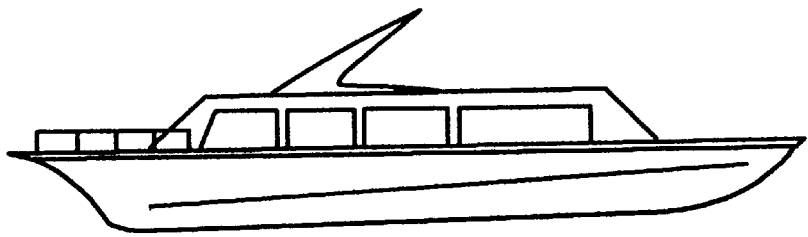
FIG. 27 is a side elevation view of the hull with two swell guideways having ∩-shaped cross sections.
Figures 1, 27:
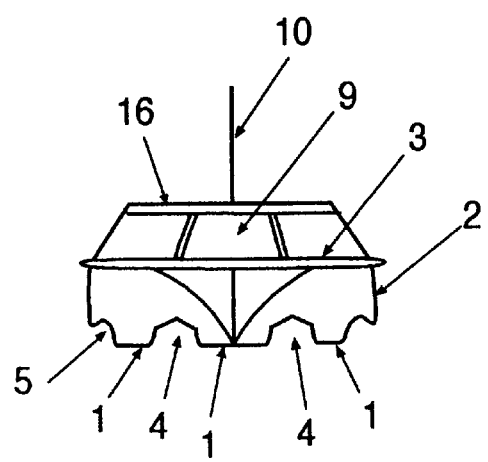
FIG. 1 is a side elevation view of a hull of the planing vessel according to the present invention.
Figures 2, 27:
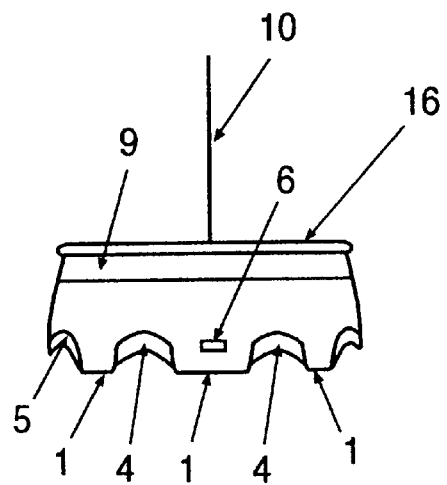
FIG. 2 is a bottom plan view of the hull shown in FIG. 1.

In addition to the hull of the present invention, the water-jet propulsion, propeller or other propulsion and control systems can be adopted and corresponding cabin, decks, upper construction and the like can be designed in accordance with different applications. Traffic boats (FIG. 23), ambulance vessels, patrol escorts and other various types of small boats, middle and large manifold vessels can be designed and built. These vessels can reach the speed range designed as well as the high speed designed. They have fine course and lateral stabilities, seaworthiness and performances and can reach a supercritical operation state so as to move smoothly in rough waters (FIG. 12-2). They have good maneuverability and flexibility and have small turning radius when changing directions (FIG. 24). The performance of the planing vessel of the present invention is much better than that of existing boats and ships.

The planing vessel according to the present invention can directly apply to ship building industry.

The examples mentioned above are not limited to any specific embodiment of the invention, but are only exemplary. The preferred embodiments of this invention have been described in detail and diclosed, it will be apparent that changes and modifications resulting in other embodiments of the hull maybe made, and some features of the invention can be used in different combinations without departing from the spirit and scope of the invention in the following claims, which belong to this inveniton.

What is claimed is:

1. A planing vessel comprising:

a hull comprising:
   a bottom;
   a deck;
   two sides;
      wherein said bottom is substantially planar and has an equicrural triangle portion in the front and a rectangle portion at the back;
   at least one swell guideway denting upwardly into and extending lengthwise throughout said bottom in a space between said bottom and said deck, said swell guideway having a centerline that is substantially parallel to and/or coincides with the centerline of said bottom, wherein said swell guideway has a predetermined cross-sectional shape, and a longitudinal sectional shape with an inclined top line having a lower front and a higher back;
   a pair of wave-splash guards each having a lower front and a higher back; and
   wherein the sizes of said equicrural triangle portion and said rectangle portion are determined in accordance with the following:
      setting the coordinate origin 0 on the bottom centerline, 0 being the midpoint of overall length 2a of said bottom, a being half the length of said bottom, 0X axis being the ordinate, 0Z axis being the abscissa, wherein X and Z are variables along said 0X axis and said 0Z axis, respectively, and said equicrural triangle portion has equicrural sides S;
      l being the projection length of said S on said OX axis;
      t being the length of said rectangle portion in the direction of said OX axis;
      2b being the width of said rectangle portion in the direction of said OZ axis;
      the sizes of l, t, 2b being determined according to the gross weight $W_1+W_2$, speed U and the planing attack angle $\theta$ of the vessels designed and referring to expressions (1) and (2) below,
         said expression (1) being $L = 2\rho U^2 a^2 P \sin\theta$, wherein L is the hydrodynamic buoyancy, wherein, $$P = \int_{-a}^{a-t} T_1(x)dx + \int_{a-t}^{a} T_2(x)dx, \ T_1(x) = \int_{-b(x)}^{b(x)} p(x,z)dz,$$

$$p(x,z) = \frac{Ka}{1-K\delta}\left\{\frac{G\exp(-\overline{G}x)\cosh k_0 z}{k_0 \xi \cosh \overline{G} \cosh k_0 b} + \right.$$

-continued $$2\sum_{n=1}^{5}\frac{(-1)^{n-1}}{C_n^2}[-\sin C_n x + k_0 R_n \cos B_n z(B_n \cos C_n x - k_0 \sin C_n x) +$$

$$k_0 G b J_n \cos D_n z(D_n \cos E_n x - k_0 \sin E_n x)]\Bigg\},$$

$$R_n = 1/(k_0^2 + B_n^2)\cos B_n b,\ J_n = 1/(k_0^2 + D_n^2)\cos E_n,\ B_n = GC_n,$$

$$\xi = \sqrt{1+\varepsilon^2}\,,\ C_n = (2n-1)\pi/2,\ D_n = C_n/b',\ E_n = C_n/Gb',$$

$$b(x) = bx/l,\ x = X/a,\ z = Z/a,\ G = \sqrt{(1-K\delta)/K\delta}\,,\ K = g/U^2$$

$$T_2(x) = \int_{-b}^{b} p(x,z)dz,\ \varepsilon = 0.0045,\ \overline{G} = k_0/G,\ b' = b/a,$$

said expression (2) being X=M/L, wherein X is the distance between the midpoint 0 of the bottom centerline and the center $0_1$ of hydrodynamic buoyancy,
wherein $$M = 2\rho U^2 a^3 N\sin\theta,\quad N = \int_{-a}^{a-t} xT_1(x)dx + \int_{a-t}^{a} xT_2(x)dx,$$

p being the density of water, U being the vessel speed, θ being the attack angle of said bottom against the horizontal when the vessel is in motion, $W_1$ being the weight of the vessel, $W_2$ being the load weight, and $L=W_1+W_2$ when the vessel is in a planing state, M being the moment of the lifting pressure on said bottom with respect to the centerline midpoint 0, $\theta_1$ being the attack angle of said bottom against the horizontal when the vessel is in a static state, $k_0$ being generally greater or equal to 0.1 and less than or equal to 1; g being the acceleration of gravity, and δ being the half depth of the stern end draft.

2. A planing vessel of claim 1 wherein each of said wave-splash guards has a lower front having a lowest point and a higher back, the lowest point of the front of each of said wave-splash guards being at the same level of or lower than the waterline when said hull is in a static state.

3. A planing vessel of claim 1 wherein the width of the base of said swell guideway in cross-section is constant along said bottom.

4. A planing vessel of claim 1 wherein a propulsion and control system is provided which comprises one or more water-jet propulsion plants, one or more power plants and one or more rudders;

said one or more water-jet propulsion plants being positioned at or near the rear of said hull near the water surface in a space between said deck and the waterline when the vessel is in a planing state, and wherein jets of said one or more water-jet propulsion plants are positioned at the vessel's stern end;

said one or more rudders being fixed at the vessel's stern, wherein each of said rudders has a rotating shaft linked up with a steering engine, and is able to rise or descend along said rotating shaft, and be elevated out of the flow generated by said one or more water-jet propulsion plants when it is not in use and descended and dovetailed with said flow when the vessel turns or brakes;

one or more water inlets having a water entry way provided on said bottom and adapted such that air will not enter said one or more water inlets when the vessel is in a planing state and the loss of water head along the water entry way is minimized.

5. A planing vessel of claim 1 wherein joints between said triangular portion and said rectangular portion of said bottom are streamlined.

6. A planing vessel of claim 1 wherein the the top of the back of said swell guideway is near said deck.

7. A planing vessel of claim 1 wherein said lower front of said top line of said swell guideway is at the same level of or lower than the waterline when said hull is in a static state; wherein said inclined top line forms an inclination angle α relative to said bottom, said α and the bottom width of said swell guideway 2r being determined according to the vessel speed U, additional hydrodynamic lift and thrust from said swell guideway, of the vessels designed and referring to expressions (3) and (4) below, said expression (3) being $F_0=4\rho U^2 a^2 Q \sin\theta \sin\alpha$, wherein $F_o$ is the additional hydrodynamic thrust provided by said swell guideway,
wherein $$Q = \frac{H_1 \tanh\overline{G}}{k_0^2 \xi \cosh k_0 b} - k_0 \sum_{n=1}^{3}\left[(-1)^{n-1} J_n H_2 \sin E_n + R_n \frac{H_3}{G}\right]$$

$$H_1 = 4r' + Ak_0^2,\quad H_2 = \frac{A}{b'} - \frac{4b'r'}{C_n^2},\quad H_3 = AG^2 - \frac{4r'}{C_n^2},$$

$$A = 2r'b'^2 + 4b'r'^2 + 8r'^3/3,\quad r' = r/a,$$

and said expression (4) being $F_0=4\rho U^2 a^2 Q \sin\theta\cos\alpha$, wherein $L_o$ is the additional hydrodynamic lift provided by said swell guideway.

8. A planing vessel of claim 1, wherein the predetermined cross-sectional shape of said swell guideway substantially comprises an arch-shaped top portion.

9. A planing vessel of claim 1, wherein the predetermined cross-sectional shape of said swell guideway substantially comprises an inverted V-shaped top portion.

10. A planing vessel of claim 1, wherein the predetermined cross-sectional shape of said swell guideway substantially comprises a top portion with a high center arch and two lower half arches placed symmetrically on both sides thereof.

11. A planing vessel comprising:
a hull having a hydrodynamic configuration comprising:
   a bottom;
   two boards;
   a deck; wherein
      said bottom is substantially planar and shaped as an equicrural triangle portion having equicrural sides in the front and a rectangle portion at the back, the sizes of said triangle portion and said rectangle portion being determined according to the gross weight and speed of the vessel designed and referring to the expressions (1) and (2) below;
   at least one swell guideway denting upwardly into and extending lengthwise throughout said bottom in a space between said bottom and said deck, the base centerline of said swell guideway being substantially coincided with and/or parallel symmetrically to the centerline of said bottom, said swell guideway having a cross-section of a denting shape with an arch top, or with an inverted V-shaped top, or with a top with a center high arch and two half-arches placed symmetrically at lower positions on both sides, and a longitudinal-section with an inclined top line having a lower front and a higher back; and a pair of wave-splash guards on boards below said deck and above said bottom, said guards being inclined baffles with a lower front and a higher back and being inlaid into boards or dented into boards to form an integrated body;

wherein the expressions and equations below are based on a coordinate system, whose origin O is at the midpoint of the centerline of said bottom, OX is an ordinate axis coinciding with the centerline of said bottom, OZ is an abscissa axis being perpendicular to said OX axis, X and Z are variables in said coordinate system to express the position of a definite point on said bottom;

the expression (1) is $L=2\rho U^2 a^2 P \sin\theta$, in which L is the hydrodynamic buoyancy;

$\rho$ is the density of water, U is the vessel speed, $\theta$ is the attack angle of said bottom against the horizontal when the vessel is in motion, a is the half length of said bottom, P is defined by $$P = \int_{-a}^{a-t} T_1(x)dx + \int_{a-t}^{a} T_2(x)dx, \; T_1(x) = \int_{-b(x)}^{b(x)} p(x,z)dz,$$

wherein $$p(x,z) = \frac{Ka}{1-K\delta}\left\{\frac{G\exp(-\overline{G}x)\cosh k_0 z}{k_0 \xi \cosh \overline{G} \cosh k_0 b} + \right.$$

$$\left. 2\sum_{n=1}^{5}\frac{(-1)^{n-1}}{C_n^2}[-\sin C_n x + k_0 R_n \cos B_n z(B_n \cos C_n x - k_0 \sin C_n x) + \right.$$

$$\left. k_0 G b J_n \cos D_n z(D_n \cos E_n x - k_0 \sin E_n x)]\right\},$$

wherein $R_n = 1/(k_0^2 + B_n^2)\cos B_n b$, $J_n = 1/(k_0^2 + D_n^2)\cos E_n$, $B_n = GC_n$, $\xi = \sqrt{1+\varepsilon^2}$, $C_n = (2n-1)\pi/2$, $D_n = C_n/b'$, $E_n = C_n/Gb'$, $b(x) = bx/l$, $x = X/a$, $z = Z/a$, $G = \sqrt{(1-K\delta)/K\delta}$, $K = g/U^2$ $T_2(x) = \int_{-b}^{b} p(x,z)dz$, $\varepsilon = 0.0045$, $\overline{G} = k_0/G$, $b' = b/a$, wherein l is a projection length for the length of said equicrural sides of said triangle portion of said bottom on said OX, t is a length of said rectangle portion of said bottom in the direction of said OX 2b is a width of said rectangle portion of said bottom in the direction of said OZ;

$k_0$ is generally in the range of less than or equal to 1 and larger than or equal to 0.1, g is the acceleration of gravity, $\delta$ is half depth of the stern end draft;

the expression (2) is $X=M/L$, wherein X is the distance between the midpoint 0 of the centerline of said bottom and the center $0_1$ of the hydrodynamic buoyancy, wherein $$M = 2\rho U^2 a^3 N \sin\theta, \; N = \int_{-a}^{a-t} xT_1(x)dx + \int_{a-t}^{a} xT_2(x)dx,$$

M is the moment of the lifting pressure on said bottom with respect to the centerline midpoint O; and $\rho$, U, $\delta$, a, t, x, $T_1(x)$, $T_2(x)$ are the same as defined in relation to expression (1).

12. A planing vessel according to claim 11, wherein the front end of said top line of said swell guideway denting vertically into said bottom is at the same level of or lower than the waterline when said hull is in a static state; said swell guideway having a longitudinal section with a top line having a lower front and a higher back forming an inclination angle $\alpha$ relative to the plane of said bottom, said $\alpha$ and the width 2r of the base of said swell guideway in its cross-section being determined according to the vessel speed, additional hydrodynamic lift and thrust provided by said swell guideway designed and referring to the expressions (3) and (4) below:

the expression (3) being $F_0 = 4\rho U^2 a^2 Q \sin\theta \sin\alpha$, in which $F_o$ is the additional hydrodynamic thrust provided by said swell guideway; $\rho$ is the density of water, U is the vessel speed, $\alpha$ is the half length of said bottom, $\theta$ is the attack angle of said bottom against the horizontal when the vessel is in motion, wherein, Q is defined by $$Q = \frac{H_1 \tanh\overline{G}}{k_0^2 \xi \cosh k_0 b} - k_0 \sum_{n=1}^{3}\left[(-1)^{n-1}J_n H_2 \sin E_n + R_n \frac{H_3}{G}\right]$$

wherein $H_1 = 4r' + Ak_0^2$, $H_2 = \frac{A}{b'} - \frac{4b'r'}{C_n^2}$, $H_3 = AG^2 - \frac{4r'}{C_n^2}$, $A = 2r'b'^2 + 4b'r'^2 + 8r'^3/3$, $r' = r/a$, and $k_0$, $\xi$, $\overline{G}$, b, b', $C_n$, $E_n$, $R_n$, $J_n$, G are the same as defined in claim 11;

the expression (4) is $F_0 = 4\rho U^2 a^2 Q \sin\theta \cos\alpha$, in which $L_0$ is the additional hydrodynamic lift provided by said swell guideway; $\rho$, U, a, Q, $\alpha$ are the same as defined in expression (3).

13. A planing vessel according to claim 11, wherein the lowest point of the front end of each of said wave-splash guards is at substantially the same level of or lower than the waterline when said hull is in a static state.

14. A planing vessel according to claim 11, wherein the width of the base of said swell guideway in its cross section is a constant throughout said bottom.

15. A planing vessel according to claim 11, comprising a propulsion and control system comprising one or more water-jet propulsion plants, one or more power plants and one or more rudders;

one or more water-jet propulsion plants being positioned at the rear of said hull near but above the water surface in a space between said deck and the waterline when the vessel is in a planing state, and between inner sides of said boards, each projection of each longitudinal centerline of each of said one or more water-jet propulsion plants coinciding or/and being parallel symmetrically with the centerline of said bottom of said hull; said one or more water-jet propulsion plants having jets positioned at the vessel's stern end;

said one or more rudders being positioned corresponding to said jets and being close to but slightly apart from said jets, said rudders being fixed at said stem, the rotating shaft of each of said rudders being linked up with a steering engine, each of said rudders being able to rise or descend along said rotating shaft, and being elevated out of the flow generated by said jets when it is not in use and descended and dovetailed with said flow when the vessel turns or brakes;

said one or more power plants being positioned in an engine room for driving said one or more water-jet propulsion plants;

one or more water inlets having a water entry way being provided on said bottom each having a longitudinal centerline coinciding with and/or symmetrically paralleling the centerline of said bottom, said water inlets being positioned on said bottom so that the distance between said water inlets and said swell guideway, the vessel's bow, the stern end or said boards is kept far enough to ensure that no air enters into said water inlets when the vessel is in a planing state and that the loss of water head along the water entry way is minimized.

16. A planing vessel according to claim 11, wherein the stern of said hull has a step.

17. A planing vessel according to claim 11, wherein the stern of said hull has a stepless streamline.

18. A planing vessel according to claim 11, wherein the joints between said triangular portion and said rectangular portion of said bottom are streamlined.

19. A planing vessel according to claim 11, wherein the top of the back of said swell guideway, whose base centerline coincides with the centerline of said bottom, is near said deck.

20. A planing vessel according to claim 11, wherein the top of the back of a pair of swell guideways, whose base centerlines are parallel symmetrically to the centerline of said bottom, are near said deck.

21. A planing vessel of claim 11, wherein the width of the base of said swell guideway in its cross section is narrower near the stem of said hull and wider near the stern of said hull.

* * * * *